US011113485B2

(12) United States Patent
Madhusudhana et al.

(10) Patent No.: US 11,113,485 B2
(45) Date of Patent: Sep. 7, 2021

(54) METHOD TO CORRELATE AN OBJECT WITH A LOCALIZED TAG

(71) Applicant: MOTOROLA MOBILITY LLC, Chicago, IL (US)

(72) Inventors: Nikhil Ambha Madhusudhana, Chicago, IL (US); Vivek K. Tyagi, Chicago, IL (US); Sudhir C. Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 276 days.

(21) Appl. No.: 15/982,360

(22) Filed: May 17, 2018

(65) Prior Publication Data
US 2019/0354735 A1    Nov. 21, 2019

(51) Int. Cl.
*H04W 4/029* (2018.01)
*G06K 7/10* (2006.01)
*G06K 9/32* (2006.01)
*G06F 3/0484* (2013.01)
*G06T 1/00* (2006.01)

(52) U.S. Cl.
CPC ..... *G06K 7/10386* (2013.01); *G06F 3/04842* (2013.01); *G06K 9/3241* (2013.01); *G06T 1/0007* (2013.01); *H04W 4/029* (2018.02)

(58) Field of Classification Search
CPC .... G06K 7/10386; G06K 9/3241; G06K 9/22; G06F 3/04842; G06T 1/0007; H04W 4/029; H04W 4/80
See application file for complete search history.

(56) References Cited

U.S. PATENT DOCUMENTS

2012/0056722 A1*  3/2012  Kawaguchi ........ G06K 7/10009
                                                340/10.1
2016/0192125 A1*  6/2016  Leland .................. H04W 4/029
                                                340/8.1

OTHER PUBLICATIONS

Kim et al., RFID Assisted Image Annotation System for a Portable Digital Camera, Oct. 27-30, 2010, KINTEX, Gyeonggi-do, Korea, pp. 1156-1159 (Year: 2010).*
Sample et al., Optical Localization of Passive UHF RFID Tags with Integrated LEDs, 2012 IEEE International Conference on RFID (RFID), pp. 116-123 (Year: 2012).*
IEEE Xplore Search Results, Feb. 22, 2021, 6 pp. (Year: 2021).*
Google Search Results, Jul. 9, 2021, 2 pp. (Year: 2021).*
(Continued)

*Primary Examiner* — Toan M Le
(74) *Attorney, Agent, or Firm* — Isidore PLLC

(57) ABSTRACT

A method and data processing device for receiving at least one response signal corresponding to a respective tag. The method includes, identifying a directional location of the respective tag relative to the user device. The method includes activating a camera device to focus on one or more focal points in an area in the directional location of the respective tag. The method includes estimating a distance of the respective tag relative to the user device. The method includes capturing an image of an object located within the area in the directional location of the respective tag. The method includes correlating the directional location, distance of the respective tag, and image of the object to generate corresponding position information. The position information provides more precise point location of the object. The method includes outputting the corresponding position information to an electronic display.

18 Claims, 8 Drawing Sheets

(56) References Cited

OTHER PUBLICATIONS

Stanculeanu, Ionel, et al., "Enhanced RSSI Localization System for Asset Tracking Services Using Non Expensive IMU", Proceedings of the 14th IFAC Symposium on Information Control Problems in Manufacturing, Bucharest, Romania, May 23-25, 2012, pp. 1838-1843.

* cited by examiner

METHOD TO CORRELATE AN OBJECT WITH A LOCALIZED TAG

BACKGROUND

1. Technical Field

The present disclosure generally relates to detecting objects and in particular to a method and electronic device for detecting and tracking objects associated with an electronic tag.

2. Description of the Related Art

Radio frequency identification tags (RFID) are widely utilized in RFID tagging systems to identify and/or track objects in a localized area. RFID tags include electronic circuitry that exchanges data with an RFID reader through radio waves. RFID tagged items cover a spectrum of object types from animate to inanimate objects. Retail, manufacturing, and medical industries are increasingly integrating RFID tagging systems in daily procedures to track objects. Current systems of localizing RFID tags include mounting multiple readers with high power antennas in various positions surrounding the RFID tagged object in an effort to triangulate the position of the RFID tag.

The use of a RFID tag localization system with high power antennas and stationary readers is not cost effective for some industries. Also, such usage requires a complex setup of antenna systems and could be difficult to integrate on a large scale. Although portable/mobile RFID tag scanners exist, these scanners are limited to solely displaying the information provided by the scanned RFID tag.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
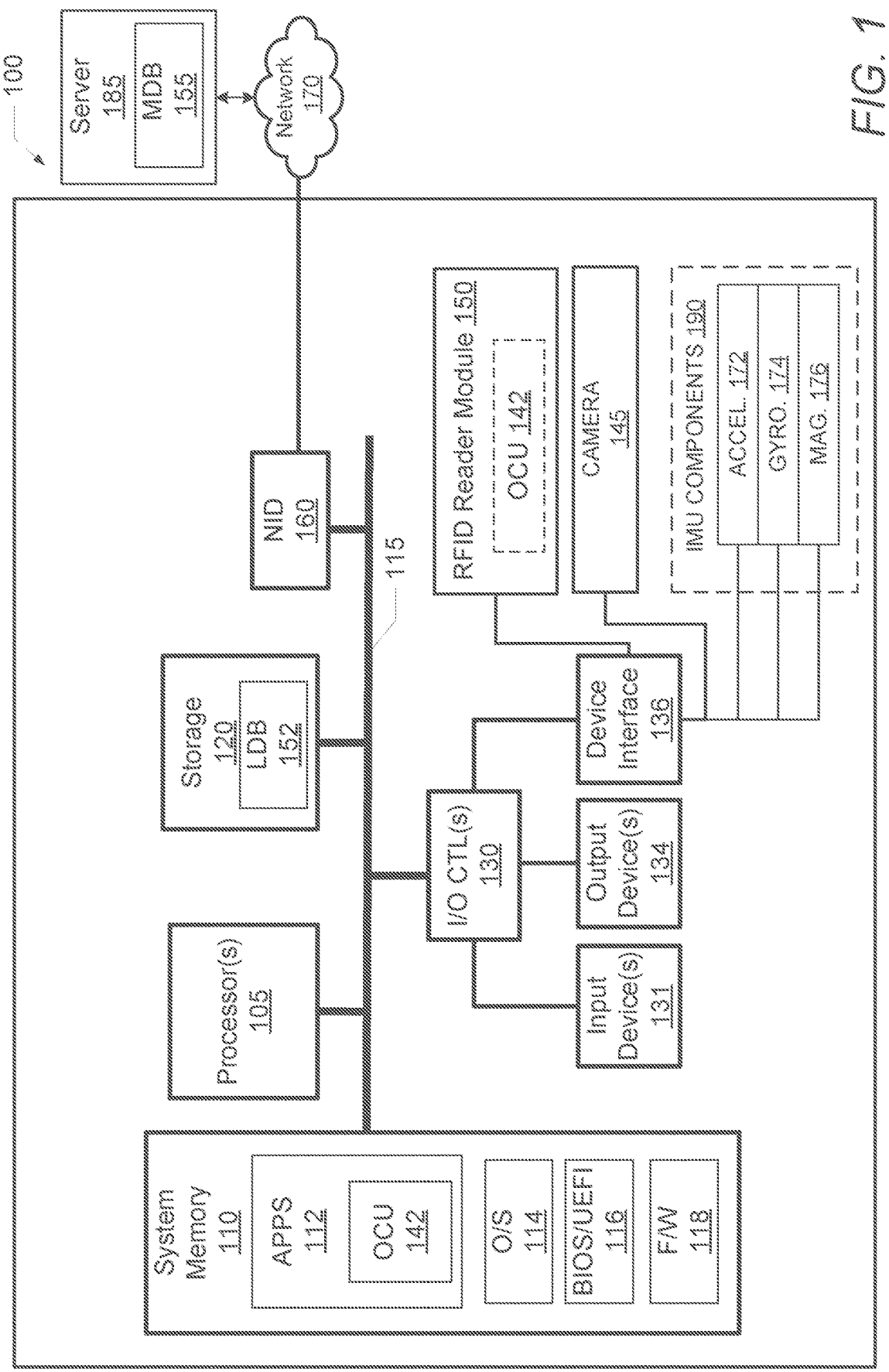
FIG. 1 provides a block diagram representation of an example data processing system within which certain aspects of the disclosure can be practiced, in accordance with one or more embodiments.

Disclosed are a method, a data processing device, and a computer program product for detecting and tracking objects in a space. The method includes receiving, by a user device, at least one response signal corresponding to a respective tag of one or more tags. The tags exist in a space located within a detectable distance of the user device. Each tag is capable of producing a corresponding response signal in response to a trigger signal. The corresponding response signal has a unique tag identification (ID) modulated thereon. In response to receiving the corresponding response signal from the respective tag within the space, the method further includes identifying, by a processor, a directional location of the respective tag relative to the user device. The method further includes activating a camera device to focus on one or more focal points in an area in the directional location of the respective tag. The method includes estimating, based on a signal strength and the directional location of the corresponding response signal, a distance of the respective tag relative to the user device. Further, the method includes capturing, by the camera device, an image of an object located within the area in the directional location of the respective tag. In response to capturing the image, the method includes correlating the (i) directional location, (ii) distance of the respective tag, and (iii) the image of the object to generate corresponding position information that provides a more precise point location of the object corresponding to the respective tag within the space. The method further includes outputting the corresponding position information of the object that corresponds to the respective tag as one of (i) audible information and (ii) position data on a corresponding position map on a graphical user interface of an electronic display.

According to one embodiment, a processor of a data processing system is communicatively coupled to a module that transmits a trigger signal, at a first frequency range. The trigger signal propagates into a space to determine if one or more tags exist in the space within a detectable distance. The processor receives, by the module, at least one response signal corresponding to a respective tag of one or more tags that exist in the space. The tags are located within a detectable distance of the user device. Each tag is capable of producing a corresponding response signal in response to a trigger signal, the corresponding response signal having a unique tag ID modulated thereon. In response to receiving the corresponding response signal from the respective tag within the space, the processor identifies a directional location of the respective tag relative to the module. The processor further activates a camera device to focus on one or more focal points in an area in the directional location of the respective tag. The processor estimates, based on a signal strength and the directional location of the corresponding response signal, a distance of the respective tag relative to the user device. Further, the processor captures, by the camera device, an image of an object located within the area in the directional location of the respective. In response to capturing the image, the processor correlates (i) the directional location, (ii) the relative distance of the respective tag, and (iii) the image of the object to generate corresponding position information. The generated corresponding position information provides a more precise point location of the object that corresponds to the respective tag within the space. The processor outputs the corresponding position information of the object that corresponds to the respective tag as one of (i) an audible information and (ii) position data on a corresponding position map on a graphical user interface of an electronic display.

The computer program product includes a computer readable storage device and program code on the computer readable storage device. When executed within a processor associated with a device, the program code enables the device to provide the various functionality presented in the above-described method processes.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, for example data processing system (DPS) 100, within which one or more of the described features of the various embodiments of the disclosure can be implemented. For example, a data processing system may be a handheld device, personal computer, a server, a network storage device, or any other suitable device and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). Stored within storage 120 is local database (LDB) 152. LDB 152 can be a mapping database that receives mapping data from one or more devices connected to DPS 100. In an alternate embodiment, a remote database (RDB) is also stored within server 185 as mapping database 155.

Storage 120 can be a hard drive or a solid-state drive. The one or more software and/or firmware modules within storage 120 can be loaded into system memory 110 during operation of DPS 100. As shown, system memory 110 can include therein a plurality of software and/or firmware modules including application(s) 112, operating system (O/S) 114, basic input/output system/unified extensible firmware interface (BIOS/UEFI) 116 and other firmware (F/W) 118. The various software and/or firmware modules have varying functionality when their corresponding program code is executed by processor(s) 105 or other processing devices within DPS 100.

DPS 100 also includes object correlation utility (OCU) 142. OCU 142 may be provided as an application that is optionally located within system memory 110 and executed by processor 105. Within this embodiment, processor 105 executes OCU 142 to provide the various methods and functions described herein. For simplicity, OCU 142 is illustrated and described as a stand-alone or separate software/firmware/logic component, which, when executed by processor, provides specific functions and methods described herein. However, in at least one embodiment, OCU 142 may be a component of, may be combined with, or may be incorporated within OS 114, and/or with/within one or more applications 112. Additional aspects of OCU 142, and functionality thereof, are presented within the description of FIGS. 2-8.

DPS 100 further comprises a network interface device (NID) 160. NID 160 enables DPS 100 to communicate and/or interface via a communication network with other devices, services, and components located external (remote) to DPS 100. For example, the devices, services, and components are located on and/or provided by external server 185. These devices, services, and components can interface with DPS 100 via an external network, such as example network 170, using one or more communication protocols. Network 170 can be a local area network, wide area network, personal area network, signal communication network, and the like. In one example, a wide area network is the Internet. Further, the connection to and/or between network 170 and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network.

DPS 100 further includes one or more input/output (I/O) controllers 130, which support connection by, and processing of signals from, one or more connected input device(s) 131, such as a keyboard, mouse, touch screen, or microphone. I/O controllers 130 also support connection to and forwarding of output signals to one or more connected output devices 134, such as a display and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to additional devices, for example, a compact disk (CD), digital video disk (DVD), flash drive, or flash memory card. In one or more embodiments, device interfaces 136 can further include General Purpose I/O interfaces, such as an Inter-Integrated Circuit (I²C) Bus, System Management Bus (SMBus), and peripheral component interconnect (PCI) buses.

In one or more embodiments, device interface(s) 136 supports connection to radio frequency identification (RFID) reader module 150. RFID reader module 150 includes a copy of OCU 142 and/or executes functions provided by OCU 142. RFID reader modules 150 monitors and detects signals associated with one or more RFID tags. Device interface(s) 136 also supports connection to an image capturing device, such as camera 145. Camera 145 is an optical instrument integrated within DPS 100 for recording or capturing images. The images are individual still photographs or sequences of images which can constitute videos or movies. Additionally, in one or more embodiments device interface(s) 136 supports connection to inertial measurement unit (IMU) components 190, which include accelerometer 172, gyroscope 174, and magnetometer 176. IMU components 190 provide directional location information of DPS 100. Additional aspects of RFID reader module 150, camera 145, and IMU components 190 and the functionalities thereof, are presented within the description of FIGS. 2-8.

Figure 2:
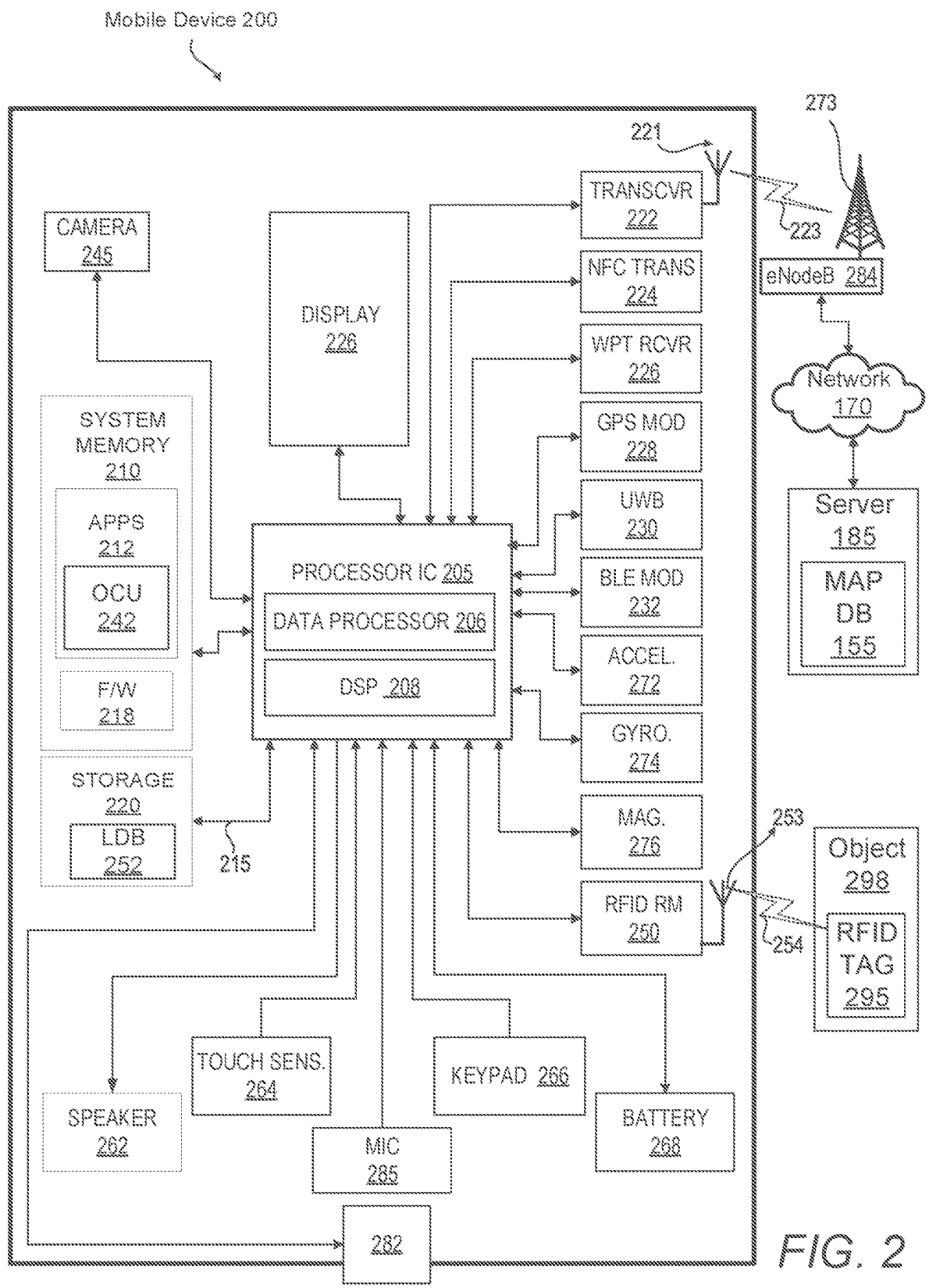
FIG. 2 illustrates a mobile device within which certain aspects of the disclosure can be practiced, in accordance with one or more embodiments.

In the description of the following figures, reference is also occasionally made to specific components illustrated within the preceding figures, utilizing the same or similar reference numbers from the earlier figures. With reference now to FIG. 2, there is illustrated another example of a data processing device, presented as mobile device 200, within which certain aspects of the disclosure can be practiced, in accordance with one or more embodiments. Mobile device 200 includes at least one processor integrated circuit (IC) 205. Included within processor IC 205 are data processor 206 and digital signal processor (DSP) 208. Processor IC 205 is coupled to system memory 210 and non-volatile storage 220 via a system communication mechanism, such as system interconnect 215. Stored within storage 220 is LDB 252. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor IC 205 or by secondary processing devices within mobile device 200.

Processor IC 205 supports connection by and processing of signals from one or more connected input/output devices such as display 226, camera 245, speaker 262, touch sensor 264, keypad 266, microphone 285. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes antenna 221 connected to transceiver 222, near field communication transceiver (NFC TRANS) 224, wireless power transfer receiver (WPT RCVR) 226, global positioning system module (GPS MOD) 228, ultra-wideband (UWB) transceiver 230, Bluetooth Low Energy (BLE) module 232, accelerometer 272, gyroscope 274, magnetometer (MAG) 276, and RFID reader module (shown as "RM" in FIG. 2) 250 connected to antenna 253, all of which are communicatively coupled to processor IC 205.

Transceiver 222 allows for wide-area or local wireless communication, via wireless signal 223, between mobile device 200 and evolved node B (eNodeB) 284, which includes antenna 273. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 222, antenna 221, wireless signal 223, antenna 273, and eNodeB 284. In one embodiment, other devices within mobile device 200 utilize antenna 221 to send and/or receive signals in the form of radio waves. For example, GPS module 228 communicatively couples to antenna 221 to receive location data. UWB transceiver 230 communicatively couples to antenna 221 and uses radio technology that can operate with very low energy levels to send and/or receive high-bandwidth communications within an approximated range. Further, BLE module 232 may connect to antenna 221, enabling mobile device 200 and/or components within mobile device 200 to communicate and/or interface with other devices, services, and components that are located external to mobile device 200 and use Bluetooth technology.

Mobile device 200 is presented as a wireless communication device. As a wireless device, mobile device 200 can communicate data over wireless network 170. For example, mobile device 200 transmits data to and/or receives data from map database 155 within server 185. In an alternate embodiment, a copy of LDB 252 is also stored, or alternatively stored within server 185 as mapping (MAP) database (DB) 155.

RFID reader module 250 can have a similar component makeup and configuration to RFID reader module 150 of DPS 100. RFID reader module 250 utilizes electromagnetic fields to automatically identify and monitor RFID tags, such as RFID tag 295 connected to object 298. Additionally, antenna 253 is utilized to monitor for a corresponding response signal 254 from RFID tag 295. In one embodiment, RFID reader module 250 is a stand-alone device that includes a built-in antenna, and RFID reader module 250 is connected to mobile device 200 via device interface 282.

As provided by FIG. 2, mobile device 200 additionally includes OCU 242 which executes on processor IC 205 to enable the processing of data received from camera 245, RFID reader module 250, accelerometer 272, gyroscope 274, and MAG 276. In at least one embodiment, OCU 242 may be a component of, may be combined with, or may be incorporated within one or more applications 212. As will be discussed further, processor IC 205 provides data to and retrieves data from LDB 252, within non-volatile storage 220. LDB 252 and/or mapping database 155 may provide a common, unified or central database for the collection of coordinates and/or data points that are associated with response signals detected by camera 245, RFID reader module 250, accelerometer 272, gyroscope 274, and MAG 276. Camera 245, RFID reader module 250, accelerometer 272, gyroscope 274, and MAG 276 may be from one or more devices similar in functionality to mobile device 200. Mobile device 200 and components thereof are further discussed in FIG. 3.

Figure 3:
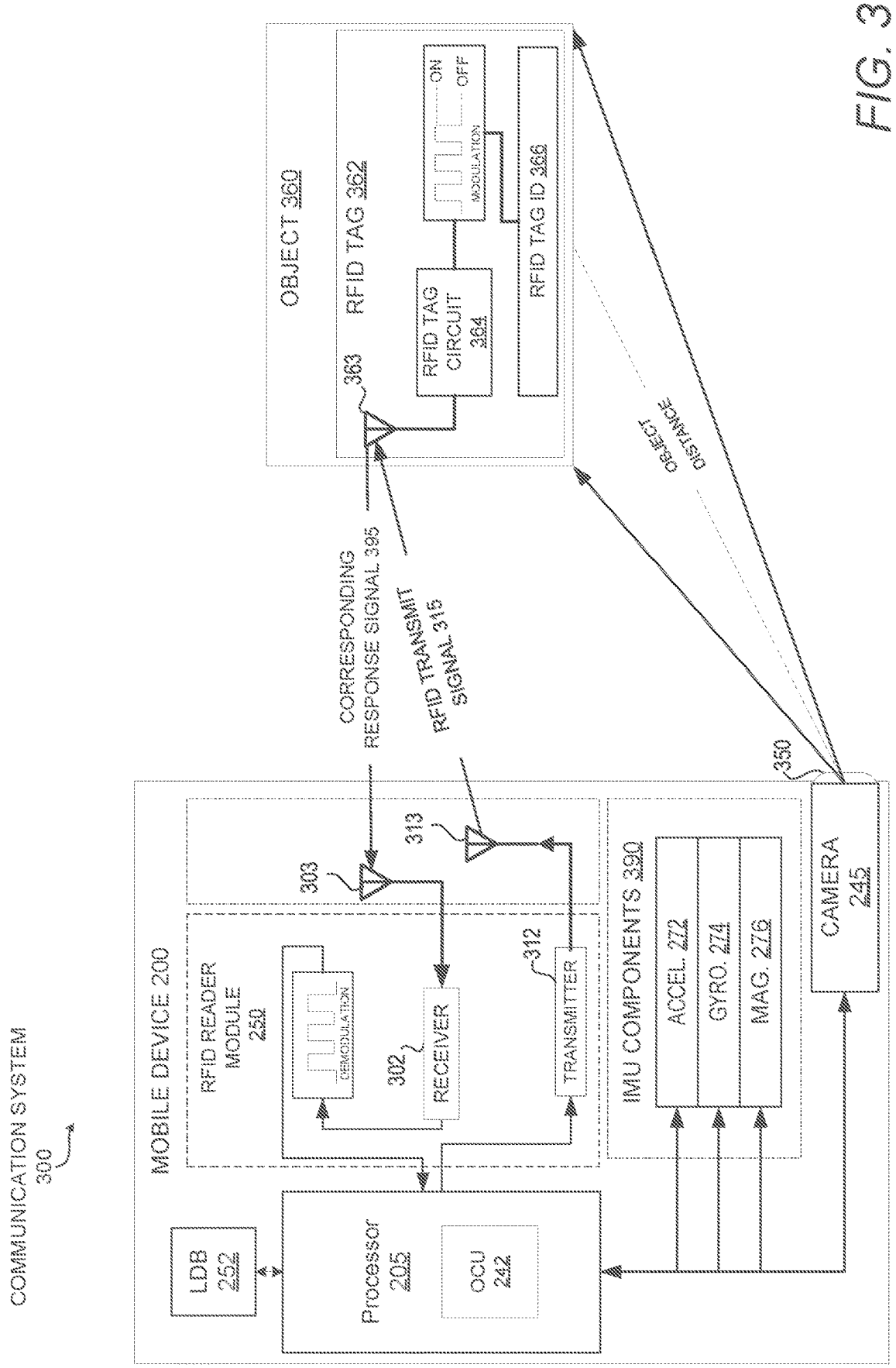
FIG. 3 illustrates a block diagram of a communication system using RFID signal transmission, inertial measurement unit (IMU) data, and image detection to detect and track a RFID tag and object, in accordance with one or more embodiments.

With reference now to FIG. 3, there is illustrated a block diagram of communication system 300 using RFID signal transmission, inertial measurement unit (IMU) data, and image detection to monitor and track RFID tag 362 and object 360, in accordance with one or more embodiments. Communication system 300 generally includes mobile device 200 and object 360.

Mobile device 200 includes processor IC 205, RFID reader module 250, IMU components 390, LDB 252, IMU components 390, and camera 245. Processor IC 205 executes/processes OCU 242. Processor IC 205 is communicatively coupled to RFID reader module 250 which includes receiver 302, connected to antenna A 303, and transmitter 312, connected to antenna 313. Antenna 303 is a directional antenna that receives corresponding response signal 395 at a known position. Antenna 313 is a directional antenna for transmitting a signal of a predetermined power level (e.g. 30 decibal-milliwatts (dBm)) in a determined direction.

Object 360 is connected to RFID tag 362. RFID tag 362 includes tag antenna 363 connected to RFID tag circuit 364 and RFID tag identification (ID) 366. RFID tag ID 366 provides information associated with the corresponding object. For example, RFID tag ID 366 may provide the name of the object/package, content of a package, dimensions of the object/package, price of the object, and one more other characteristics that are associated with the object/package. In one or more embodiments, RFID tag 362 is a passive tag. Therefore, RFID tag 362 does not require a transceiver, and does not require a battery. In another embodiment, the RFID tags are active tags. In still another embodiment, the RFID tags are a combination of passive and active tags.

RFID reader module 250 transmits RFID transmit signal 315 in the direction of RFID tag 330 via antenna 313. RFID transmit signal 315 is, for example, an indefinite signal with continuous amplitude, frequency, or phase. RFID tag 362 is capable of producing a corresponding response signal in response to a trigger signal such as transmit signal 315. RFID tag 362 harvests energy from RFID transmit signal 315. The current flowing on antenna 313 produces a voltage that is induced on tag antenna 363. The induced current leads to radiation, producing a signal that can be detected. This detectable signal is referred to as the RFID response signal, or the corresponding response signal 395. Corresponding response signal 395 has a unique RFID tag ID (366) modulated on the signal. More specifically, RFID tag 362 modulates RFID tag ID 366 on the corresponding response signal using ON-OFF keying through changing the impedance on tag antenna 363 to transmit a '1' bit and remaining silent (with no impedance change) for a '0' bit. RFID reader module 250 reads the corresponding response signal on tag antenna 303, and provides the tag information to processor IC 205.

IMU components 390 are electronic sensors/devices within mobile device 200 that enable processor IC 205, utilizing the instruction of OCU 242, to measure and report the directional location of mobile device 200. IMU components 390 include, but are not limited to including accelerometer 272, gyroscope 274, and MAG 276. Accelerometer 272 measures gravitational and non-gravitational acceleration to determine velocity and other measurements associated with the quantified physical movement of mobile device 200. Gyroscope 274 communicates the angular position of an associated device, such mobile device 200, using gravity to help determine orientation of mobile device 200. Further, MAG 276 communicates general rotational information, and the relative orientation of mobile device 200 relative to the Earth's magnetic north. MAG 276 detects the Earth's magnetic field along three perpendicular axes (X, Y, and Z axis) to assist in determining a three-dimensional coordinate of mobile device 200 in a space. In one embodiment, accelerometer 272, gyroscope 274, and MAG 276 collectively contribute to providing directional information that determines the orientation and motion of mobile device 200 when mobile device 200 is monitoring for RFID tag 362. For example, accelerometer 272, gyroscope 274, and MAG 276 determine a general horizontal position within the space along a horizontal axis relative to the user device of RFID tag 362 and object 360. Further accelerometer 272, gyroscope 274, and MAG 276 determine a general vertical position within the space along a vertical axis relative to mobile device 200 of RFID tag 362 and object 360. In another embodiment, one or more of accelerometer 272, gyroscope 274, and MAG 276 contribute to determining the orientation and motion of mobile device 200 when mobile device 200 is monitoring for RFID tag 362 and object 360.

Camera 245 includes lens 350. Camera 345 is also utilized to monitor RFID tag 362 and object 360. Camera 245 is utilized, in part, to support determining the distance of RFID tag 362 and object 360 relative to mobile device 200 or another identified point in the space. In one embodiment, to determine the distance of object 360, processor IC 205 utilizes the known focal length of lens 350 and the size of the imaging sensor of camera 345, where the imaging sensor size is specific to camera 345. The imaging sensor shape and size determines the angle of view of lens 350 when used within camera 345. Processor IC 205 identifies the imaging sensor size based on a unit of length and pixels. Utilizing known dimensional measurements of object 360 as determined from the information collected from RFID tag ID 366, processor IC 205 identifies the distance between the camera and the detected image. In one embodiment, a calibration object in the field of view is utilized to identify the distance of the object. For example, markers can be provided on the floor, wall, and/or shelving units. In another embodiment, processor IC 205 utilizes an algorithm that includes a formula for calculating the distance from camera 345 to object 360. For example, the ratio of the size of the object in the image and the physical height of the object (in real life) is the same as the ratio between the focal length and distance of object and camera. Therefore, to obtain the distance of object 360 from camera 345, processor IC 205 utilizes distance (mm)=(focal length (mm)*physical height of the object (mm)*camera frame height in device (pixels))/(image height (pixels)*sensor height (mm)). Processor IC 205 uses known variables to solve for distance of object 360, and processor IC 205 enables the derived distance to be output audibly, output to a GUI, and/or output to mapping DB 155 and LDB 252.

In operation, a module, for example RFID reader module 250, of mobile device 200 transmits a trigger signal at a first frequency range. The trigger signal, RFID transmit signal 315, propagates into a space to determine if one or more RFID tags, such as RFID tag 362, exist in the space within a detectable distance. In response to RFID reader module 250 detecting at least one RFID tag in the space, processor IC 205 receives at least one response signal. In one embodiment, each response signal corresponds to a respective RFID tag (362). In response to receiving corresponding response signal 395, RFID reader module 250 demodulates the response signal to identify a unique RFID tag ID (366) of the respective RFID tag 362. In another embodiment, reader module 250 demodulates the response signal(s) to isolate response signals that are each distinguishable by a respective unique RFID tag ID.

In response to receiving corresponding response signal 395 from RFID tag 362 within the space, processor IC 205 identifies a directional location of the respective RFID tag 362 relative to the user device. Processor IC 205 determines the orientation/direction of corresponding response 395 signal from the directional antenna (303) and IMU components 390. IMU sensors 390 identifies the position of mobile device 200 when antenna 303 receives the corresponding signal. Processor IC 205 activates camera 245 to focus on one or more focal points in an area that is in the directional location of the respective RFID tag 362, as determined by antenna 303 and IMU sensors 390. Processor IC 205 triggers camera 245 to collect an image of an object based, in part, on the direction in which corresponding response signal 395 is received. Processor IC 205 further modifies the angle of focus based on motion detected by IMU components 390.

Processor IC 205 estimates a distance of the respective RFID tag 362 relative to the user device based on a signal strength and the directional location of corresponding response signal 395. Processor IC 205 utilizes a received signal strength indication (RSSI) algorithm to determine the power level of corresponding response signal 395 received at antenna 303. In one embodiment, the detected RSSI correlates to an approximated distance of object 360 from mobile device 200.

In an embodiment in which camera 245 has an unobstructed line of sight (or partially unobstructed line of sight) to object 360, processor IC 205 captures, by camera 245, an image of object 360. Object 360 is located within the area in the directional location of respective RFID tag 362. In one embodiment, processor IC 205 initiates pattern recognition analysis of the image collected by camera 245 to correlate object 360 with RFID tag 362. In response to the image detected by camera 245 corresponding to information provided by RFID tag 362, processor IC 205 correlates several features associated with RFID tag 362. Processor IC 205 correlates (i) the directional location, (ii) the distance of the respective RFID tag 362, and (iii) the image of the object within in the directional location of the respective RFID tag 362 to generate corresponding position information that provides a more precise point location of the object that corresponds with the RFID tag within the space. Processor IC 205 outputs the determined position information of the object corresponding to the respective RFID tag as one of (i) audible information via speaker 262 (FIG. 2) and (ii) position data on a corresponding position map that is displayed as a graphical user interface on electronic display 226 (FIG. 2).

Utilizing IMU components 390 within mobile device 200 provides multiple advantages for detecting RFID tag 362 and object 360 in the space. For example, mobile device 200 can be in motion when transmitting RFID signal 315 and when detecting corresponding response signal 395. IMU components 390 monitor motion of mobile device 200, and processor IC 205 provides a correction factor when analyzing the response signal. The correction factor, or adjustment, is based, in part, on vibrational motion, rotational motion, and a change in distance of mobile device 200 relative to RFID tag 362 and object 360. Processor IC 205 monitors for vibrational motion, rotational motion, and a change in distance change for a time period between triggering of RFID transmit signal 315 and detection of the corresponding response signal. The additional feature of image analysis of object 360 using camera 245 in conjunction with signal strength determination of the RFID tag 362 helps processor IC 205 to determine a more precise distance of RFID tag 362 and object 360, for example the distance, height, and depth of the object 360. Further, image analysis of object 360 using camera 245 in conjunction with signal strength determination, enables processor IC 205 to identify a three-dimensional location of object 360 in space relative to mobile device 200. Processor IC 205 determines an x, y, and/or z coordinate that corresponds to the distance, height, and depth of object 360 in a space relative to mobile device 200, so that a user may identify a more precise location of object 360. The x, y, and/or z coordinates can be output to map DB 155. Further, the position data/coordinates can be audibly presented to the user and can also be displayed on the corresponding position map in real time. The audible information may include instructions expressed as steps, paces, and/or directional position of object 360.

Figure 4:
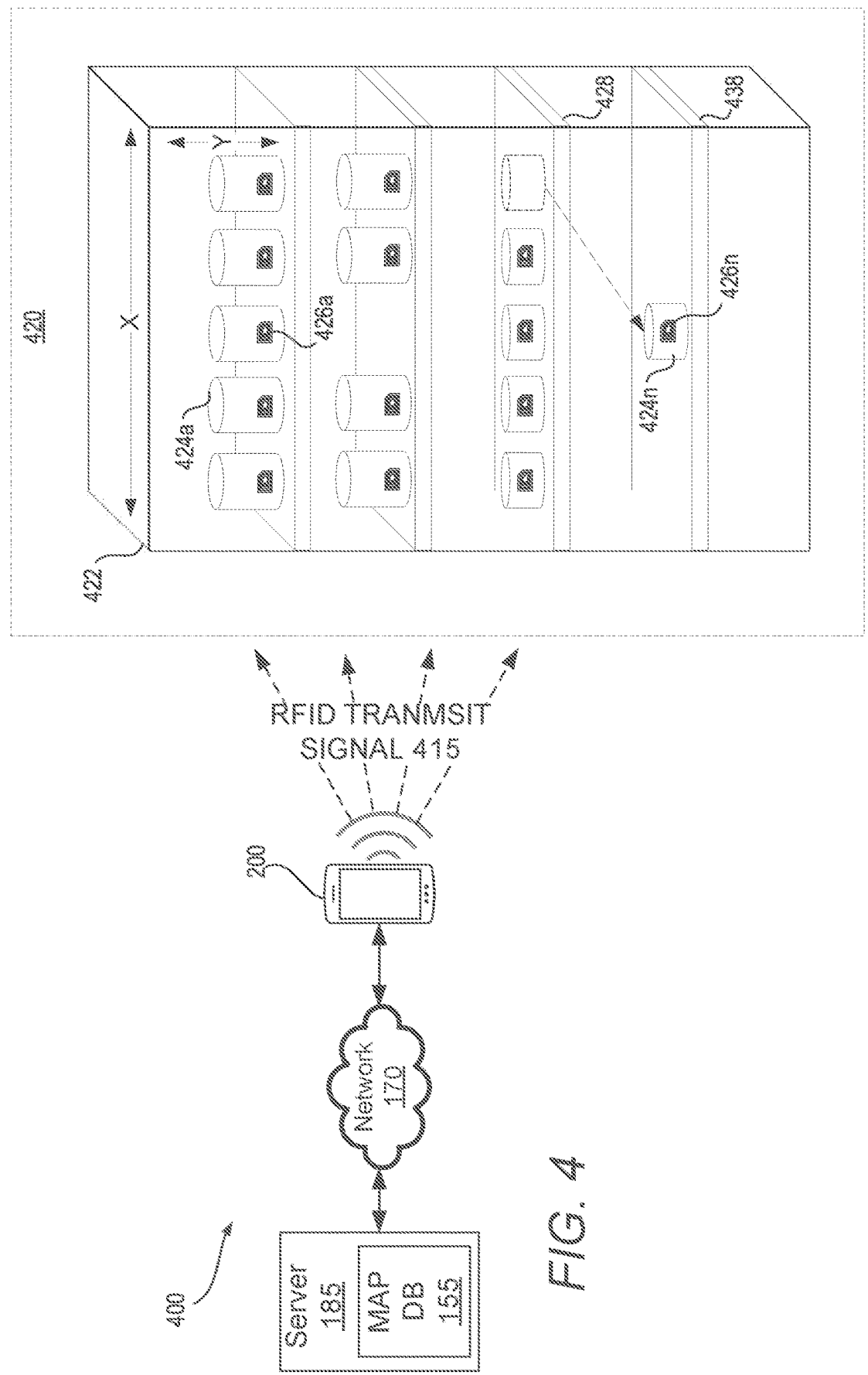
FIG. 4 illustrates a communication network in which the mobile device of FIG. 2 can be used to transmit signals into a space to track a RFID tag associated with an object, according to one or more embodiments.

FIG. 4 illustrates a communication network in which the mobile device (200) of FIG. 2 can be used to transmit signals into a space (420) to track a RFID tag (426) associated with an object (424), according to one or more embodiments.

Communication network 400 generally includes server 185, network 170, mobile device 200, space 420, shelving unit 422, plurality of objects 424a-n, and corresponding plurality of RFID tags 426a-n. Shelving unit 422 is a type of shelving unit that includes a first and second platform 428 and 438, respectively, for placing a plurality of objects 424a-n. Space 420 can also include an area and/or item of known dimensions, for example a known x-dimension and a known y-dimension.

Each RFID tag of the plurality of RFID tags 426a-n are capable of producing a corresponding response signal in response to RFID transmit signal 415. A unique RFID tag ID is modulated on each corresponding response signal. The unique RFID tag ID can be modulated on each corresponding response signal with or without the RFID tags 426a-n visible to a user. In one embodiment, RFID reader module 250 identifies up to 1000 RFID tags per second, with a range of detection that is dependent, in part, on the selected frequency for the RFID communication system. Within the present embodiment, the plurality of RFID tags 426a-n are passive tags and, as a result, do not require a battery.

Mapping database 155, of server 185, includes a reference database of RFID tag IDs and/or additional corresponding identifiers for the associated objects. An associated object and object information is assigned to each RFID tag ID of RFID tags 426a-n. The object information database may include, but is not limited to including, pattern recognition data as well as size and shape dimensions utilized for image analysis of objects associated with the corresponding RFID tag. Additionally, the object information associated with mapping database 155 can include customer review information, videos, ratings, etc. associated with the respective object. Further mapping database provides location information for the plurality of objects 424a-n and the corresponding plurality of RFID tags 426a-n.

In one embodiment, processor IC 205 correlates RFID tag 426a to object 424a. Processor IC 205, of mobile device 200, triggers RFID reader module 250 to transmit, at a first frequency range, RFID transmit signal 415, which propagates into space 420. In response to transmission of RFID transmit signal 415 into the space, RFID reader module 250 receives a plurality of corresponding response signals (395) each having a unique RFID tag modulated thereon. Processor IC 205 identifies the objects that correlate to the plurality of identified RFID tags 426a-n using information from the reference database associated with map DB 155. Processor IC 205 triggers camera 245 to capture an image of the objects that are in the direction of the identified RFID tags 426a-n. Camera 245 selects a focal point by identifying the location in which the directional antenna (303) received the corresponding signal. Additionally, camera 245 can select and focus on one or more focal points utilizing direction information collected by IMU components 390 and distance information determined by analysis of the signal strength of each corresponding response signal of the RFID tags.

Processor IC 205 identifies the objects using pattern recognition. Processor IC 205 compares the information/items associated with the plurality of RFID tags 426a-n to images collected by camera 245 for each of the plurality of objects 424a-n. In response to a predetermined number of similar characteristics existing between the objects in the database and objects in the image, processor IC 205 verifies that the RFID tag corresponds to the associated object. The corresponding position information of the object can be output as audible information that provides the user with instructions that include a distance to the object in a preferred unit (e.g., steps, inches, meters, millimeters, etc.), a directional indication of the objects (e.g., left, right, top, bottom, above, beneath, etc.), and/or placement of the object on shelving unit 422 (e.g., shelf, column, row, etc.). Further position data can be provided to a corresponding position map on a graphical user interface of an electronic display.

Utilizing data of IMU component 390, along with known dimensions of the objects retrieved from the reference database associated with map DB 155, and camera 245 imaging sensor and lens data, processor IC 205 provides a precise three axis (x, y, z) data group to identify the location of each of the plurality of RFID tags 426a-n and the corresponding plurality of objects 424a-n. In response to a predetermined number of points not correlating between the objects identified using the database and the objects in the image, processor IC 205 outputs a notice of an inconsistency between the database information/image and the captured image.

In another embodiment, processor IC 205 initiates tracking of a respective RFID tag, for example RFID tag 426n and associated object, object 424n. Concurrent with monitoring for changes in the corresponding response signals, processor IC 205 utilizes one or more sensors (IMU components 390) associated with mobile device 200 to identify device movement. In response to triggering RFID transmit signal 415, reader module 250 receives a corresponding signal for the RFID tag ID of RFID tag 426n. Based on a change in received signal strength of the corresponding response signal and image data of the object, processor IC 205 identifies relative movement of RFID tag 426n and object 424n. Processor IC 205 determines when a change in signal strength of the corresponding response signal is due to motion of mobile device 200 or motion of RFID tag 426n. If motion associated with mobile device 200 is detected, processor IC 205 determines the degree of movement, associated with the corresponding response signal, and provides a corrected signal strength based on the degree of movement (motion and direction) of mobile device 200.

Processor IC 205 corrects/adjusts the signal strength based on the movement detected by IMU components 390. Further, processor IC 205 identifies that the direction in which the corresponding response signal is received and the change in signal strength indicates movement of RFID tag 426n and object 424n. In one example, reader module 250 receives a response signal that identifies a RFID tag ID associated with RFID tag 426n. Reader module 250 detects a change in signal strength and a change in the direction in which the directional antenna (303) receives the corresponding signal for RFID tag 426n. The change in signal strength and the change in the direction in which the directional antenna (303) receives the corresponding signal is due to physical movement of object 424n and RFID tag 426n. Accordingly, processor IC 205 determines that object 424n and RFID tag 426n has moved from platform 428 to platform 438. Further, to verify and or quantify the distance in the location change, processor IC 205 triggers camera 245 to collect an image. The image focus point is based on the directional location of a corresponding response signal. In response to receipt of the image from camera 245 that provides a visual depiction of the object and associated position change, processor IC 205 verifies the distance and position of the change through image analysis. Processor IC 205 generates updated position data of RFID tag 426n and object 424n based, in part, on the adjusted signal strength value of the respective RFID tag, and in part on the image data. Processor IC 205 updates the RFID tag and object mapping database, accordingly, to track the movement of respective object 424n in space 420.

In one embodiment, IMU components 390 of mobile device 200 utilize machine learning to identify location changes and distance measurements associated with location changes for RFID tag 426*n* and object 424*n*. Processor IC 205 generates updated position data, for example distance measurements, object location, and/or object information, based on the detected known pattern of movement for the RFID tag and object. Learned and/or known patterns of movement can be verified by an analysis of images collected by camera 245.

Figure 5:
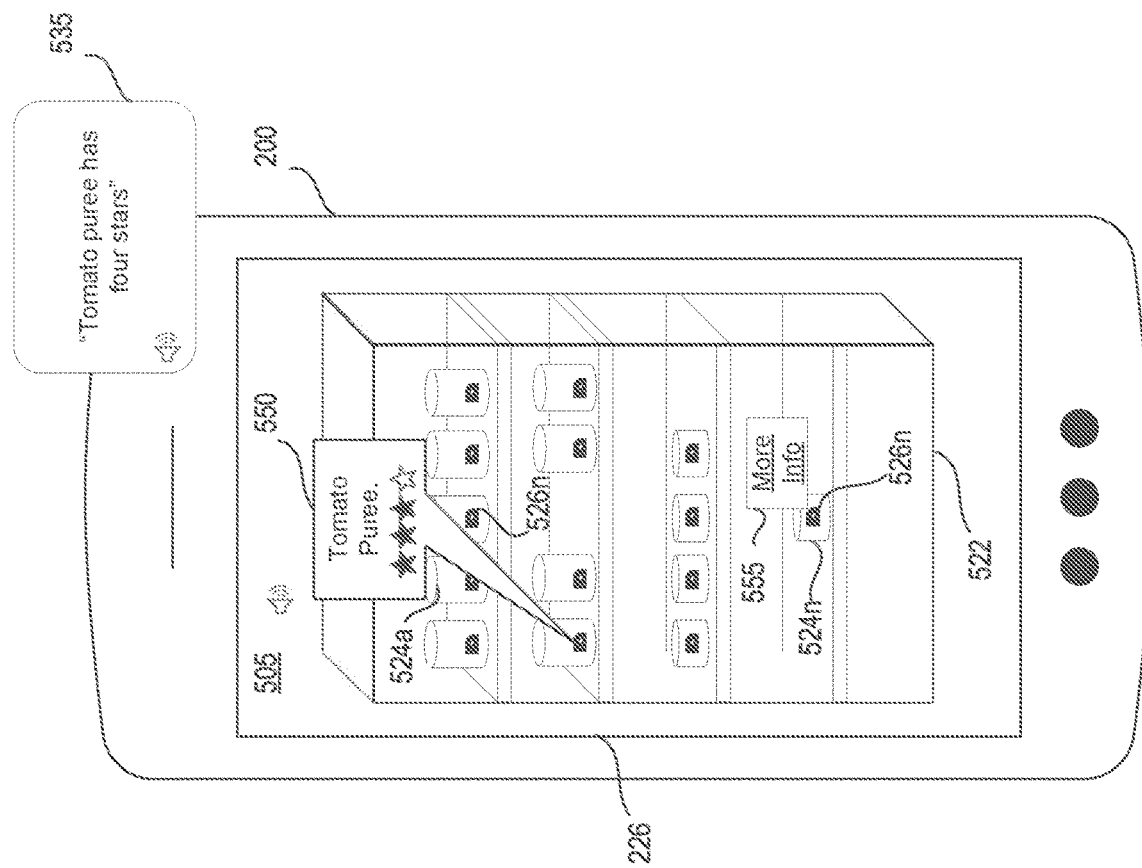
FIG. 5 illustrates an example graphical user interface that can be output to the display of the mobile device of FIG. 2, according to one or more embodiments.

FIG. 5 illustrates an example graphical user interface 505 that can be output to display 226 of mobile device 200 of FIG. 2, according to one or more embodiments. FIG. 5 generally includes mobile device 200 which includes display 226. Output to display 226 is graphical user interface 505 which includes an image of items within space 420 of FIG. 4. The image collected by camera 245 includes an image of shelving unit 422 as unit image 522. Unit image 522 further depicts contents of shelving unit 422 including object images 524*a-n*, RFID tag images 526*a-n*, RFID tag information graphic 550, information link 555, and image 535 for providing access to audible information In one embodiment, selecting information link 555 or a graphical symbol associated with an object (424) enables output of audible information associated with the object and/or position of the object.

In one embodiment, camera 245 captures an image of space 420. In another embodiment camera 245 captures an image in the directional location of an RFID tag, for example, RFID tag image 526*n* associated with object image 524*n*. Processor IC 205 outputs the captured image on graphical user interface of display 226. Processor IC 205 identifies data associated with one or more RFID tag images 524*a*-524*n* from mapping database 155. Based on information retrieved from the mapping database, processor IC 205 links access to the information within graphical user interface 505 at or near the respective RFID tag image. In one embodiment, a representation of the corresponding object(s) is overlaid with the image of the object. Selection of the representation of the object, an icon near the object, mouse clicks, or a tactile selection of the object triggers presentation of the information. For example, presented information can include RFID tag information graphic 550 and information link 555.

Further, in another embodiment, a tactile selection of image 535 initiates audible communication of the information that is associated with object 524*a*. The audible dictation is for use by users who are blind, visually challenged, are not equipped to read, or in a situation that minimizes their ability to read the information associated with object 524*a*. Therefore, processor IC 205 enables audible dictation of the information to the user.

In another embodiment, in response to the signal strength of the corresponding response signal of the respective RFID tag no longer being detectable, processor IC 205 initiates one or more operations. The operation can include updating the RFID tag and object mapping database. Further the operation can include removing an image (526*n*) that correlates to the RFID tag and object from graphical user interface 505. Still further, the operation can include generating audible information that corresponds to repositioning of the object.

Figure 6:
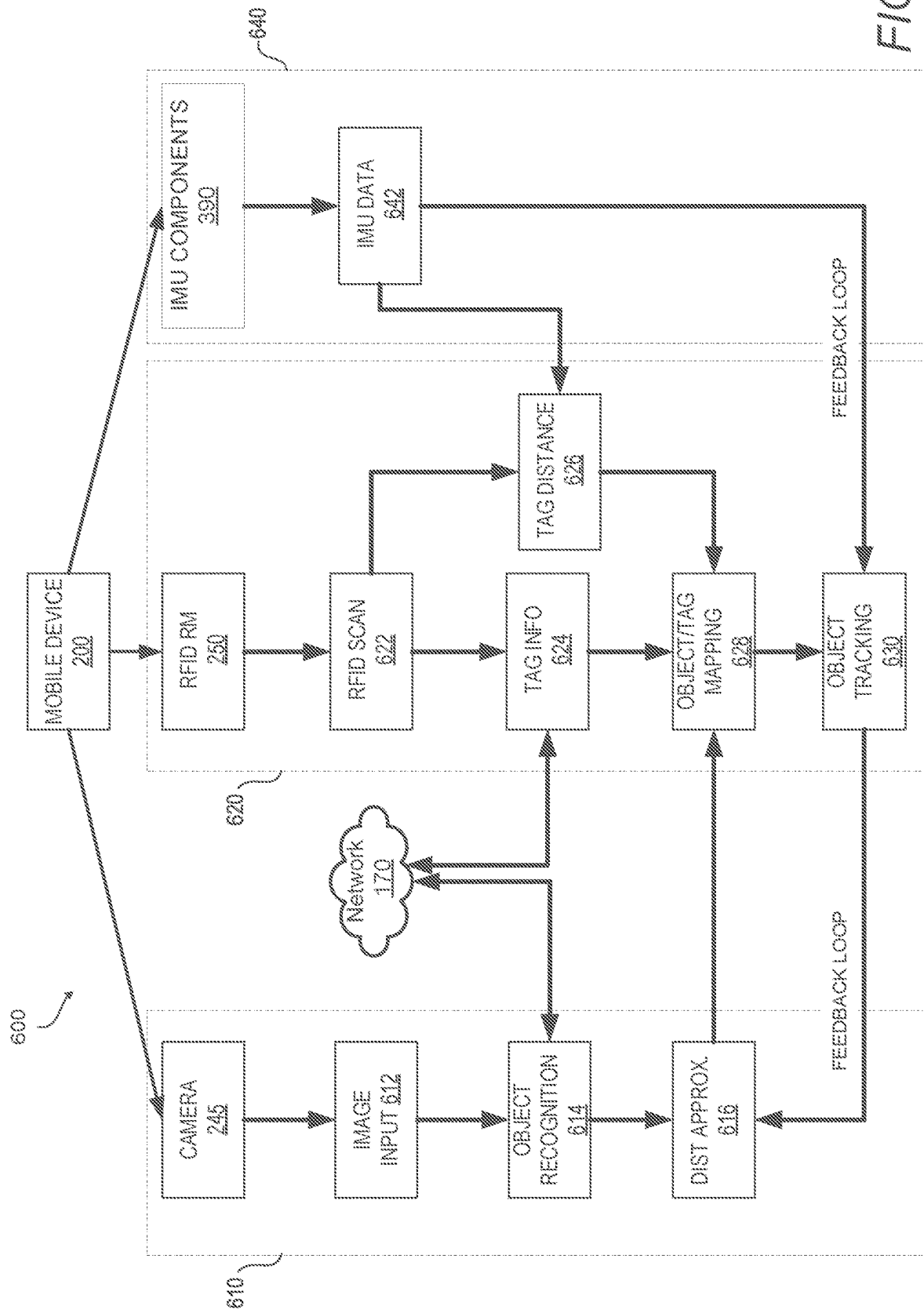
FIG. 6 illustrates an example workflow diagram for utilizing an RFID reader module, an image capturing device, and IMU components of FIG. 2 to correlate the location of a RFID tag and object, according to one or more embodiments.

FIG. 6 illustrates an example workflow 600 for utilizing RFID reader module 250, an image capturing device (245), and IMU components 390 of FIG. 2 to correlate the location of a RFID tag and associated object, according to one or more embodiments.

Mobile device 200 advantageously utilizes multiple devices (camera 245, RFID reader module 250, and IMU components 390) to correlate the location of an RFID tag and associated object. In one embodiment, mobile device 200 contemporaneously utilizes camera 245, RFID reader module 250, and IMU components 390 to correlate the location of an RFID tag and associated object in a space. Each device can have independent workflows that are integrated to generate more precise measurements and directional location of the RFID tag and associated object. Further, the devices can collectively or independently provide updated data to mapping database 155 (on network 170). The updated data may provide additional reference points that support more precise image recognition of the objects that are associated with respective RFID tags. The devices also collectively and/or independently provide updated data to mapping database 155. The updated data enables OCU 242 to identify and approximate movement of the objects through pattern recognition.

Processor IC 205 initiates workflow 620 by triggering RFID reader module 250 to initiate an RFID scan of a space, at block 622. If there is a RFID tag that can respond to the RFID transmit signal existing in the space, RFID reader module 250 receives a corresponding response signal that includes a corresponding RFID tag ID modulated on the response signal, at block 624. Processor IC 205 searches a local and or networked (170) database, for example, LDB 152 and/or mapping database 155, to identify information regarding the object associated with the corresponding RFID tag. Processor IC 205 additionally utilizes the received signal strength of the response signal concurrently with IMU data associated with mobile device 200 (from block 642) to help identify tag distance at block 626. In response to concurrently receiving the corresponding response signal from the respective tag within the space and IMU data, the processor identifies a directional location of the respective tag relative to the module.

Processor IC 205 initiates workflow 610 by triggering camera 245 to capture an image. In one embodiment, processor IC 205 triggers capturing of the image in response to RFID reader module receiving a corresponding RFID response signal when a RFID transmit signal is transmitted. In another embodiment, processor IC 205 triggers capturing of the image in response to user input. In still another embodiment, processor IC 205 triggers capturing of the image in response to a request for additional information regarding an object that is associated with a RFID tag. In response to capturing of the image, at block 614, processor IC 205 utilizes a database such as LDB 152 or mapping database 155 to identify items through object(s) recognition. In one embodiment, processor IC 205 can determine whether there are no objects of interest and/or objects associated with the RFID tag in the image. In response to identification of an object, at workflow block 616, processor IC 205 utilizes stored measurement data of the objects, as well as imaging sensor and lens dimensions to approximate the distance of one or more objects in the image relative to the mobile device (200). For example, the stored data for the camera lens and imaging sensor are input into a distance formula (as described above), along with dimensional information of the object, to help determine the object distance.

IMU components 390 are utilized to monitor one or more sensors associated with mobile device 200 to identify movement of device 200. Devices of IMU components 390 may include one or more of an accelerometer, a gyroscope, and a magnetometer which provide IMU data 642. As RFID reader module 250 receives RFID response signals corresponding to transmission of a RFID transmit signal, IMU components 390 monitor movement associated with mobile device 200. In response to IMU components 390 detecting movement, processor IC 205 identifies the amount of rotational, vibrational, directional movement associated with mobile device 200 and correlates the movement to a correction factor. Processor IC 205 adjusts the response signal based on the value of the correction factor and updates the position map based on the modified location/position of the RFID tag and object.

At block 628, RFID tag information received from the RFID scan, tag distance (as approximated by the received signal strength), and object distance approximation (as provided by the camera image of the object) are collectively provided as position data on a corresponding position map. The corresponding position map is continuously updated via a feedback loop that continuously (or periodically) provides IMU data 642 and object tracking data to the corresponding position map. In addition to mapping the RFID tag and object on the position map, the position map is utilized to track movement of the object, at block 630.

Figure 7:
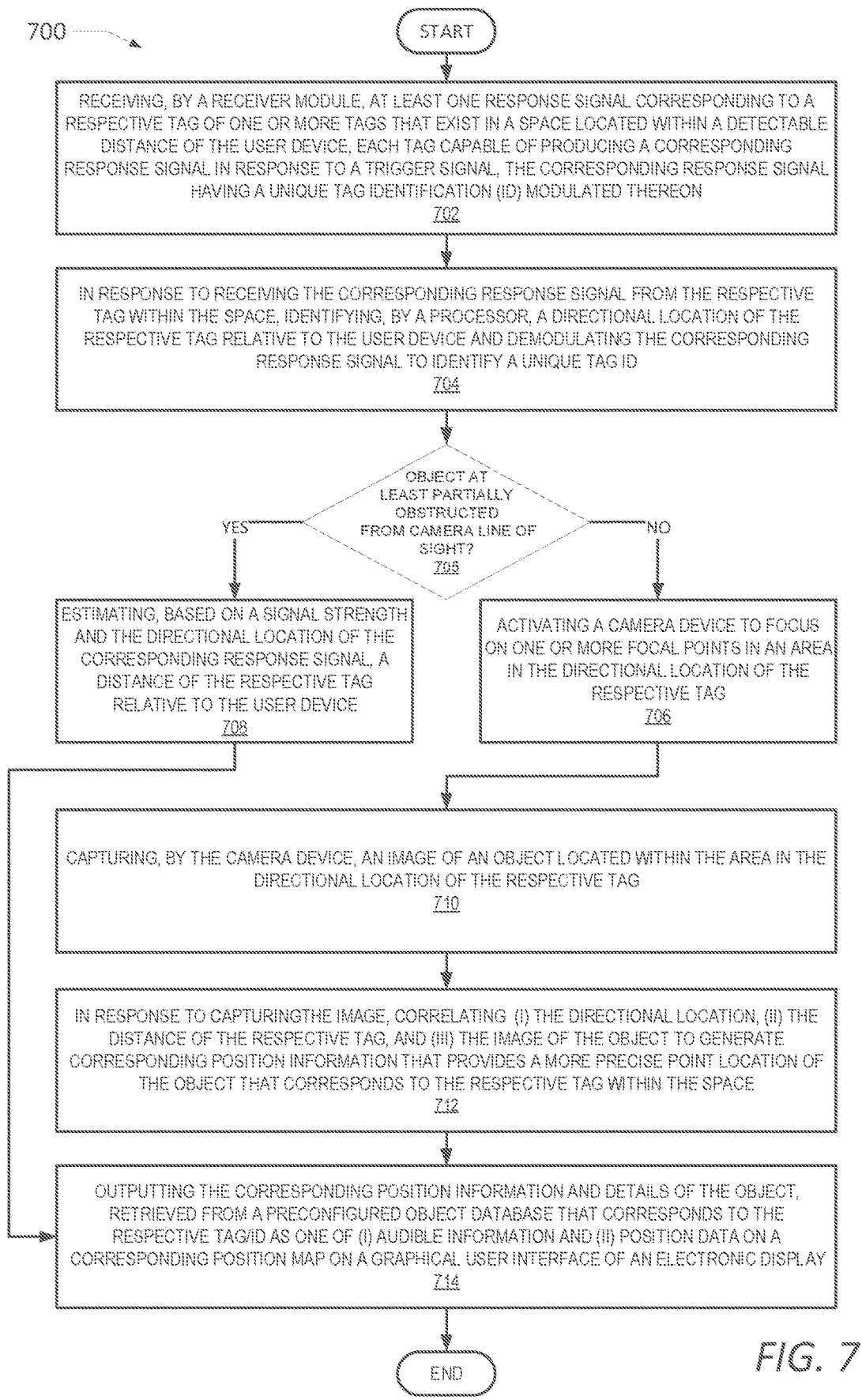
FIG. 7 is a flow chart illustrating a method for using RFID signals, image data, and directional location to detect and identify the distance of a RFID tag and associated object in the space, in accordance with one or more embodiments.
Figure 8:
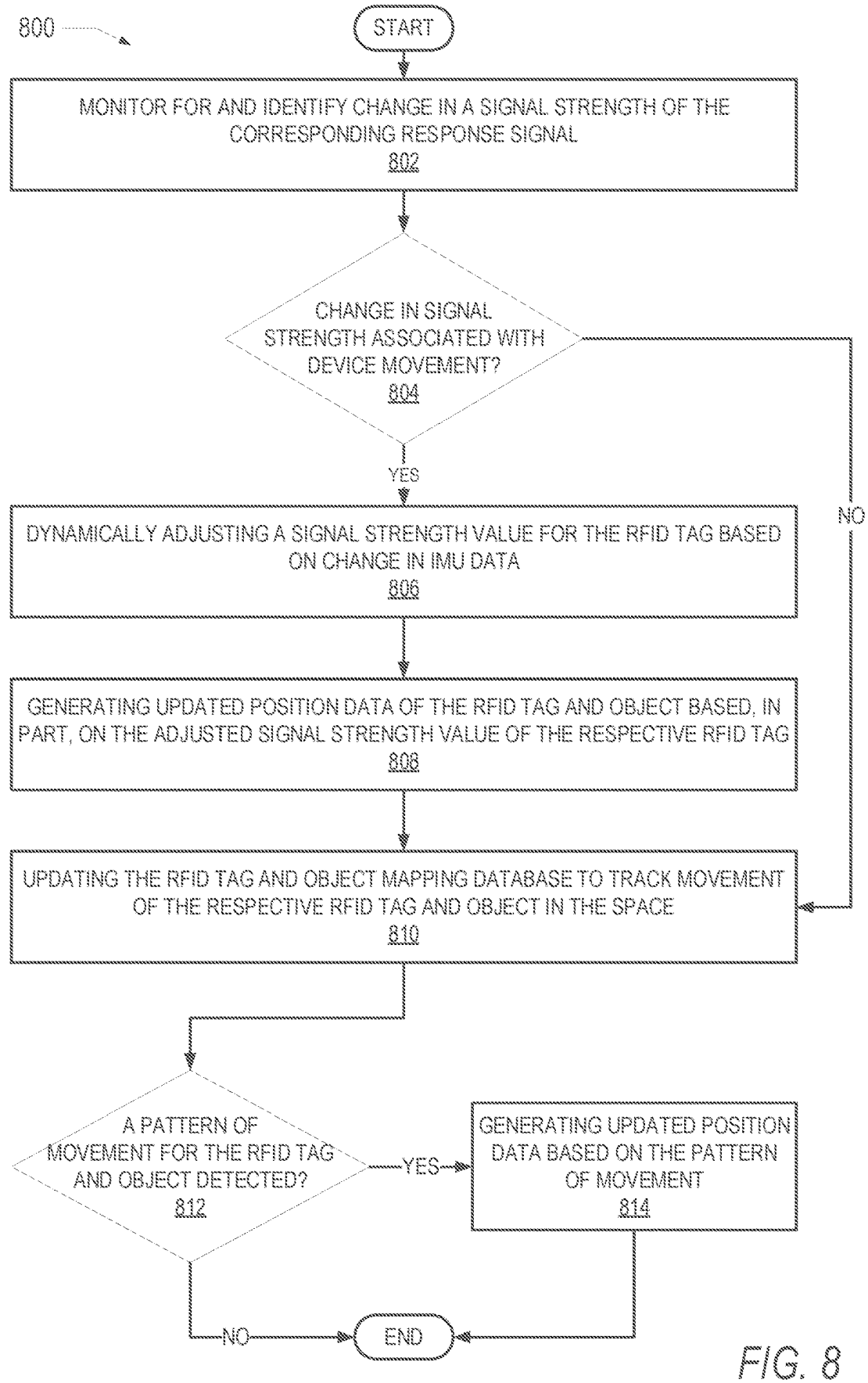
FIG. 8 is a flow chart illustrating a method for identifying movement of an object based on received signal strength of the RFID signals, in accordance with one or more embodiments.

Referring now to FIGS. 7 and 8. In FIG. 7 there is provided a flow chart illustrating a method for using RFID signals, image data, and directional location to detect and identify a RFID tag and associated object in a space, in accordance with one or more embodiments. In FIG. 8 there is provided a flow chart illustrating a method for identifying movement of an object based on received signal strength of the RFID signals, in accordance with one or more embodiments. Aspects of the methods are described with reference to the components of FIGS. 1-6. Several of the processes of the methods provided in FIGS. 7 and 8 can be implemented by a processor (e.g., processor(s) 105 or processor IC 205) executing software code of OCU 242. In the following method processes described in FIGS. 7 and 8, processor IC 205 executes OCU 242 to perform the steps described herein.

Method 700 commences at the start block, then proceeds to block 702. At block 702 processor IC 205 receives, by module (250), at least one response signal corresponding to a respective tag of one or more tags that exist in a space. The space is located within a detectable distance of mobile device 200. Each tag is capable of producing a response signal in response to a trigger signal (transmit signal 415). The response signal has a unique tag ID modulated thereon. In response to receiving the response signal from the respective tag within the space, at block, processor IC 205 identifies a directional location of the respective tag relative to the user device and demodulates the response signal to identify a unique tag ID of the respective tag. At decision block 705 processor IC 205 determines whether the object is at least partially obstructed from the line of sight of camera lens 350. In response to the object not being at least partially obstructed from the line of sight of camera lens 350, processor IC 205 activates a camera device (245) to focus on one or more focal points in an area in the directional location of the respective tag at block 706. A camera device (camera 245) captures an image of an object located within the area in the directional location of the respective tag, at block 710. In response to capturing the image, processor IC 205 correlates (i) the directional location, (ii) the distance of the respective tag, and (iii) the image of the object in the directional location of the respective tag to generate corresponding position information that provides a more precise point location of the object that corresponds to the respective tag within the space, at block 712. The method proceeds to block 714.

In response to the object being at least partially obstructed from the line of sight of camera lens 350, at block 708, processor IC 205 estimates, based on a signal strength and the directional location of the corresponding response signal, a distance of the respective tag relative to the user device. The method proceeds to block 714. At block 714 processor IC 205 outputs the corresponding position information and details of the object. The details of the object are retrieved from a preconfigured object database (e.g., LDB 252 and mapping database 155) based on the demodulated tag ID. The corresponding position information corresponds to the position of the respective tag. Both the position information and object details are output as one of (i) audible information and (ii) position data on a corresponding position map on a graphical user interface of an electronic display. The process concludes at the end block.

Method 800 commences at the start block, then proceeds to block 802. At block 802, processor IC 205 monitors for and identifies a change in signal strength of a corresponding response signal. In another embodiment, processor IC 205 monitors for a change in image data of the object. Processor IC 205 determines, at decision block 804, whether the change in signal strength is associated with device movement. In response to the change in signal strength not being associated with device movement the method proceeds to block 810. In response to the change in signal strength being associated with device movement as determined by IMU data, processor IC 205 dynamically adjusts a signal strength value of a response signal corresponding to the RFID tag, at block 806. At block 808, processor IC 205 generates updated position data of the RFID tag and object, based, in part, on the adjusted signal strength value of the respective response signal of the RFID tag. At block 810, processor IC 205 updates the RFID tag and object mapping database (155) to track movement of the respective RFID tag and object in the space. At block 812, processor IC 205 determines whether a pattern of movement for the RFID tag and object is detected. In response to a pattern of movement not being detected, the method proceeds to the end block. In response to a pattern of movement being detected, at block 814, the method generates updated position data based on the pattern of movement. The process concludes at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   receiving, by a user device, at least one response signal from a tag antenna corresponding to a respective tag of one or more tags that exist in a space located within a detectable distance of the user device, each tag antenna producing a corresponding response signal in response to a trigger signal, the corresponding response signal having a unique tag identification (ID) of a respective tag modulated thereon;
   in response to receiving the corresponding response signal from the respective tag within the space, identifying, by a processor, a directional location of the respective tag relative to the user device, wherein the identifying comprises: determining, for the respective RFID tag and object, (i) a general horizontal position within the space along a horizontal axis relative to the user device; and (ii) a general vertical position within the space along a vertical axis relative to the user device;
   activating a camera device to focus on one or more focal points in an area in the directional location of the respective tag;
   estimating, based on a signal strength and the directional location of the corresponding response signal, a distance of the respective tag relative to the user device;
   capturing, by the camera device, an image of an object located within the area in the directional location of the respective tag;
   in response to capturing the image, correlating the (i) directional location, (ii) distance of the respective tag, and (iii) image of the object to generate corresponding position information that provides a more precise point location of the object that corresponds to the respective tag within the space; and
   outputting the corresponding position information of the object that corresponds to the respective tag.

2. The method of claim 1, further comprising:
   triggering a radio frequency identification (RFID) reader module of the user device to transmit, at a first frequency range, the trigger signal that propagates into the space to determine a presence of the respective tag of the one or more tags, wherein the respective tag is a respective RFID tag.

3. The method of claim 2, further comprising:
   providing, to a RFID tag and object mapping database, the position data of the respective RFID tag and object within the space;
   initiating tracking of the respective RFID tag and object within the space;
   monitoring one or more inertial measurement unit (IMU) sensors associated with the user device to identify device movement, wherein the one or more IMU sensors are one or more of an accelerometer, a gyroscope, and a magnetometer;

identifying movement of the RFID tag and object based on a change in a signal strength of the corresponding response signal and image data of the object; and correlating a change in device movement with a change in signal strength of the corresponding response signal.

4. The method of claim 3, further comprising:

determining when a change in signal strength is associated with device movement;

dynamically adjusting a signal strength value for the RFID tag when the change in signal strength of the corresponding response signal is in response to device movement;

generating updated position data of the RFID tag and object based, in part, on the adjusted signal strength value of the respective RFID tag, and in part on image data; and updating the RFID tag and object mapping database to track movement of the respective RFID tag and object in the space, wherein the RFID tag and object mapping database recognizes a pattern of movement for the RFID tag and object and generates updated position data based on the pattern of movement.

5. The method of claim 1, further comprising:

determining when the signal strength of the corresponding response signal of the respective RFID tag is no longer detectable within the space; and in response to the signal strength of the corresponding response signal of the respective RFID tag no longer being detectable, initiating an operation from among: (i) updating the RFID tag and object mapping database, (ii) removing, from a graphical user interface, an image that correlates to the RFID tag and object, (iii) generating an audible notation that corresponds to repositioning of the object.

6. The method of claim 1, further comprising:

identifying camera device parameters, comprising a focal length of a lens of the camera device, a field of view of the space, and a size of a preselected camera sensor;

determining more specific position data of the object within the space relative to the camera device, based on geometric relationships between the camera device parameters; and providing, to the corresponding position map, the more specific position data of the object within the space.

7. The method of claim 1, further comprising:

in response to receiving the corresponding response signal, demodulating the response signal to identify a unique RFID tag ID of the respective RFID tag, wherein the unique RFID tag ID is modulated on the corresponding response signal;

initiating, within a preconfigured object database, a search for information associated with an object assigned to the unique RFID tag ID;

outputting the corresponding position information of the object that corresponds to the respective tag as position data on a corresponding position map on a graphical user interface of an electronic display;

linking access to the information within the graphical user interface at or near the point location of the respective RFID tag along with a representation of a corresponding object; and in response to selection of the representation of the object, triggering presentation of the information.

8. A data processing device comprising:

a module that transmits a trigger signal, at a first frequency range, that propagates into a space to determine if one or more tags exist in the space within a detectable distance; and a processor that is communicatively coupled to the module and which:

receives, by the module, at least one response signal from a tag antenna corresponding to a respective tag of one or more tags that exist in a space located within a detectable distance of the module, each tag antenna capable of producing a corresponding response signal in response to a trigger signal, the corresponding response signal having a unique tag identification (ID) of the respective tag modulated thereon;

in response to receiving the corresponding response signal from the respective tag within the space, identifies a directional location of the respective tag relative to the module, wherein to identify the directional location the processor:

determines, for the respective RFID tag and object, (i) a general horizontal position within the space along a horizontal axis relative to the user device (ii) a general vertical position within the space along a vertical axis relative to the user device;

activates a camera device to focus on one or more focal points in an area in the directional location of the respective tag;

estimates, based on a signal strength and the directional location of the corresponding response signal, a distance of the respective tag relative to the module;

captures, by the camera device, an image of an object located within the area in the directional location of the respective tag;

in response to capturing the image, correlates the (i) directional location, (ii) distance of the respective tag, and (iii) image of the object to generate corresponding position information that provides a more precise point location of the object that corresponds to the respective tag within the space; and outputs the corresponding position information of the object that corresponds to the respective tag.

9. The data processing device of claim 8, wherein the processor triggers the module to transmit the trigger signal that propagates into the space to determine a presence of the respective tag, wherein the module is a radio frequency identification (RFID) reader module and the respective tag is a respective RFID tag.

10. The data processing device of claim 9, wherein the processor:

provides, to a RFID tag and object mapping database, the position data of the respective RFID tag and object within the space;

initiates tracking of the respective RFID tag and object within the space;

monitors one or more inertial measurement unit (IMU) sensors associated with the module to identify device movement, wherein the one or more IMU sensors are one or more of an accelerometer, a gyroscope, and a magnetometer;

identifies movement of the RFID tag and object based on a change in a signal strength of the corresponding response signal and image data of the object; and correlates a change in device movement with a change in signal strength of the corresponding response signal.

11. The data processing device of claim 10, wherein the processor:
   determines when a change in signal strength is associated with device movement;
   dynamically adjusts a signal strength value for the respective RFID tag when the change in signal strength of the corresponding response signal is in response to device movement;
   generates updated position data of the respective RFID tag and object based, in part, on the adjusted signal strength value of the respective RFID tag, and in part on image data; and
   updates the RFID tag and object mapping database to track movement of the respective RFID tag and object in the space, wherein the RFID tag and object mapping database recognizes a pattern of movement for the respective RFID tag and object and generates updated position data based on the pattern of movement.

12. The data processing device of claim 10, wherein the processor:
   determines when the signal strength of the corresponding response signal of the respective RFID tag is no longer detectable within the space; and
   in response to the signal strength of the corresponding response signal of the respective RFID tag no longer being detectable, updates the RFID tag and object mapping database and initiates an operation from among: removing, from a graphical user interface, an image, that correlates to the RFID tag and object; and generating an audible notation that corresponds to repositioning of the object.

13. The data processing device of claim 9, wherein the processor:
   in response to receiving the corresponding response signal, demodulates the response signal to identify a unique RFID tag ID of the respective RFID tag, wherein the unique RFID tag ID is modulated on the corresponding response signal;
   initiates, within a preconfigured object database, a search for information associated with an object assigned to the unique RFID tag ID;
   outputs the corresponding position information of the object that corresponds to the respective tag as position data on a corresponding position map on a graphical user interface of an electronic display;
   links access to the information within the graphical user interface at or near the point location of the respective RFID tag along with a representation of a corresponding object; and
   in response to selection of the representation of the object, triggers presentation of the information.

14. The data processing device of claim 8, wherein the processor:
   identifies camera device parameters, comprising a focal length of a lens of the camera device, a field of view of the space, and a size of a preselected camera sensor;
   determines more specific position data of the object within the space relative to the camera device, based on geometric relationships between the camera device parameters; and
   provides, to the corresponding position map, the more specific position data of the object within the space.

15. A computer program product comprising:
   a computer readable storage device; and
   program code on the computer readable storage device that when executed within a processor associated with a user device, the program code enables the user device to provide a functionality of:
   receiving, by a user device, at least one response signal from a tag antenna corresponding to a tag of one or more tags that exist in a space located within a detectable distance of the user device, each tag antenna capable of producing a corresponding response signal in response to a trigger signal, the corresponding response signal having a unique tag identification (ID) of the respective tag modulated thereon;
   in response to receiving the corresponding response signal from the respective tag within the space, identifying, by a processor, a directional location of the respective tag relative to the user device, wherein the user devices identifying the directional location comprises determining, for the respective RFID tag and object, (i) a general horizontal position within the space along a horizontal axis relative to the user device; and (ii) a general vertical position within the space along a vertical axis relative to the user device;
   activating a camera device to focus on one or more focal points in an area in the directional location of the respective tag;
   estimating, based on a signal strength and the directional location of the corresponding response signal, a distance of the respective tag relative to the user device;
   capturing, by the camera device, an image of an object located within the area in the directional location of the respective tag;
   correlating the (i) directional location, (ii) distance of the respective tag, and (iii) image of the object to generate corresponding position information that provides a more precise point location of the object that corresponds to the respective tag within the space; and
   outputting the corresponding position information of the object that corresponds to the respective tag.

16. The computer program product of claim 15, wherein the program code further enables the user device to provide a functionality of:
   triggering a respective radio frequency identification (RFID) reader module of the user device to transmit, at a first frequency range, the trigger signal that propagates into the space;
   providing, to a RFID tag and object mapping database, the position data of the respective tag and object within the space, wherein the respective tag is a respective RFID tag;
   initiating tracking of the respective RFID tag and object within the space;
   monitoring one or more inertial measurement unit (IMU) sensors associated with the user device to identify device movement, wherein the one or more IMU sensors are one or more of an accelerometer, a gyroscope, and a magnetometer;
   determining, by the sensors, a general horizontal position within the space along a horizontal axis relative to the user device of the respective RFID tag and object;
   determining, by the sensors, a general vertical position within the space along a vertical axis relative to the user device of the respective RFID tag and object;
   identifying movement of the respective RFID tag and object based on a change in a signal strength of the corresponding response signal and image data of the object; and
   correlating a change in device movement with a change in signal strength of the corresponding response signal.

17. The computer program product of claim 16, wherein the program code further enables the user device to provide a functionality of:
- determining when a change in signal strength is associated with device movement;
- dynamically adjusting a signal strength value for the respective RFID tag when the change in signal strength of the corresponding response signal is in response to device movement;
- generating updated position data of the respective RFID tag and object based, in part, on the adjusted signal strength value of the respective RFID tag, and in part on image data;
- updating the RFID tag and object mapping database to track movement of the respective RFID tag and object in the space, wherein the RFID tag and object mapping database recognizes a pattern of movement for the respective RFID tag and object and generates updated position data based on the pattern of movement;
- determining when the signal strength of the corresponding response signal of the respective RFID tag is no longer detectable within the space; and
- in response to the signal strength of the corresponding response signal of the respective RFID tag no longer being detectable, initiating an operation from among: (i) updating the RFID tag and object mapping database, (ii) removing, from a graphical user interface, an image, that correlates to the respective RFID tag and object, (iii) generating an audible notation that corresponds to repositioning of the object.

18. The computer program product of claim 15, wherein the program code further enables the user device to provide a functionality of:
- in response to receiving the corresponding response signal, demodulating the response signal to identify a unique RFID tag ID of the respective RFID tag, wherein the unique RFID tag ID is modulated on the corresponding response signal;
- initiating, within a preconfigured object database, a search for information associated with an object assigned to the unique RFID tag ID;
- outputting the corresponding position information of the object that corresponds to the respective tag as position data on a corresponding position map on a graphical user interface of an electronic display;
- linking access to the information within the graphical user interface at or near the point location of the respective RFID tag along with a representation of a corresponding object; and
- in response to selection of the representation of the object, presenting the information.

* * * * *